(No Model.)
D. LONG.
BARROW WHEEL.
No. 393,250.　　　　　　　　　Patented Nov. 20, 1888.
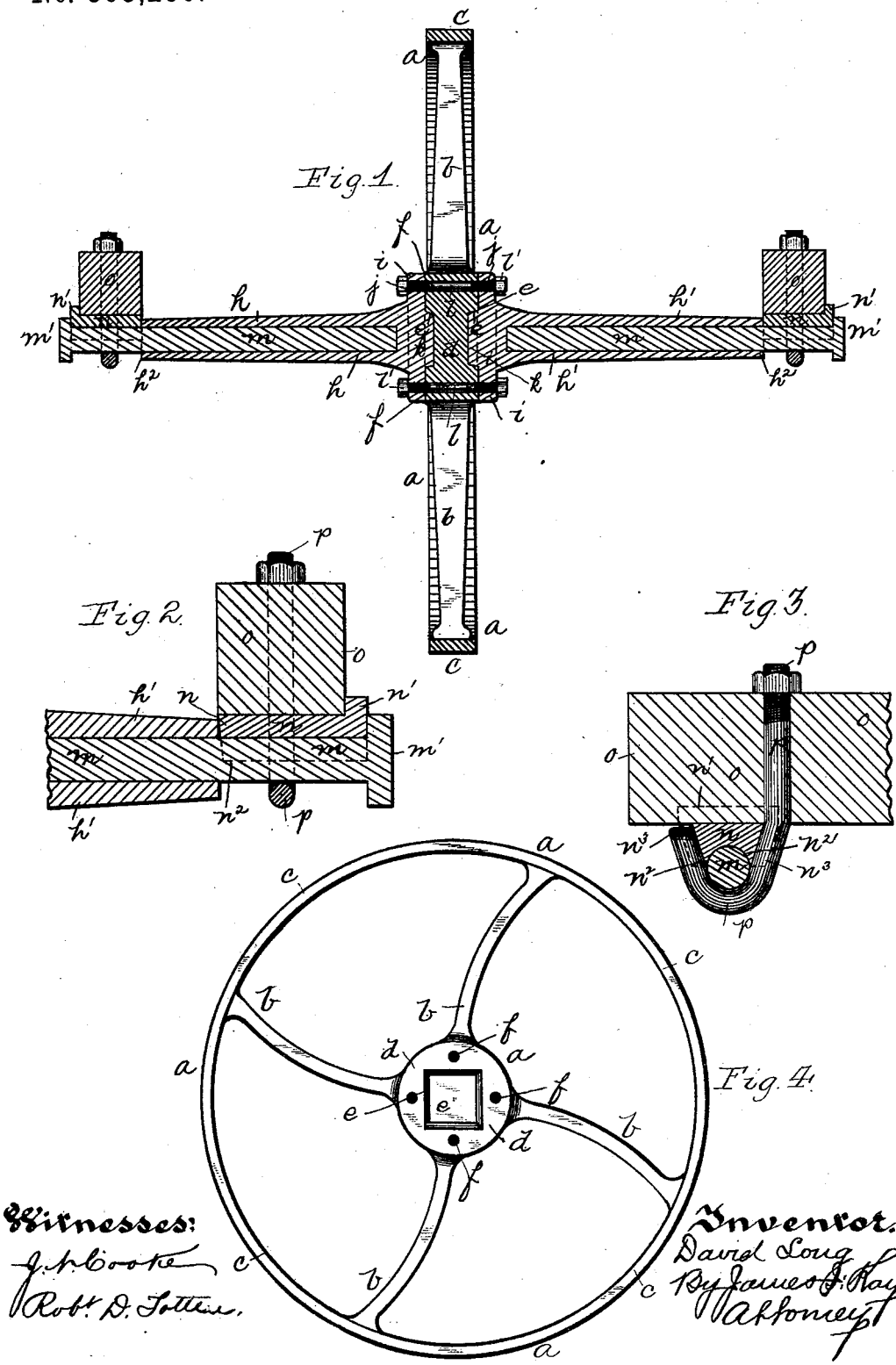
Witnesses:
J. N. Cooke
Rob't D. Totten
Inventor.
David Long
By James F. Ray
Attorney

United States Patent Office.

DAVID LONG, OF NEW HAVEN, PENNSYLVANIA.

BARROW-WHEEL.

SPECIFICATION forming part of Letters Patent No. 393,250, dated November 20, 1888.

Application filed March 15, 1888. Serial No. 267,208. (No model.)

*To all whom it may concern:*

Be it known that I, DAVID LONG, a resident of New Haven, in the county of Fayette and State of Pennsylvania, have invented a new and useful Improvement in Wheels of Coke-Barrows; and I do hereby declare the following to be a full, clear, and exact description thereof.

My invention relates to wheels for barrows, and more especially coke-barrows. These coke-barrows are for carrying very large loads of coke, and the strain upon the wheel and frame of the barrow in dumping the load is so great that the wheel soon becomes broken and the frame spread apart, so that it can no longer be used. As now constructed, the coke-barrow wheels consist of a cast-iron wheel with a hole in the hub thereof, through which is passed the axle of wrought iron or steel, the wheel being held in position on the axle by a collar or shoulder formed on the axle-shoulder, and a key driven through a hole in the axle on the other side of the hub and serving to hold the wheel against the shoulder. This axle is secured to the bars of the barrow-frame by a hook-shaped bolt or strap passing down through the ends of the bars and embracing the axle, holding it against a bearing-block on the under side of the bars, and permitting the axle to move laterally in the frame more or less. The great difficulty with this construction has been that the wheel soon becomes loose on the axle, as both the shoulder and key become worn to such an extent as to permit the lateral movement of the wheel on the axle, which causes a wabbling of the wheel and increases the labor of pushing the barrow, at the same time causing the wheel to soon break from the lack of rigidity to resist the strains thrown on it when the barrow is dumped. In consequence, also, of the free movement of the axle the frame of the barrow is subjected to a spreading action each time that the barrow is dumped, the strain in dumping coming upon the arm or side bar of the barrow which is raised up, and as that arm presses against the spindle of the wheel the frame is pressed or spread apart and soon becomes worthless.

The object of my invention is to so construct the wheel that it cannot come loose on the axle, but will always be rigidly held thereon, and at the same time provide an attachment of the axle to the frame-bars which will strengthen the frame by resisting the tendency of the latter to spread during the dumping operation.

To these ends my invention consists in certain combinations of parts, more fully hereinafter set forth.

To enable others skilled in the art to make and use my invention, I will describe the same more fully, referring to the accompanying drawings, in which—

Figure 1 is a longitudinal vertical section of the wheel and its axle. Fig. 2 is a detail section of the attachment of the wheels to the bars of the barrow frame. Fig. 3 is a detail side view of the same. Fig. 4 is a view of the body of the wheel.

Like letters refer to like parts in each of the figures of the drawings.

In constructing my improved wheel the body $a$ is made of cast metal, and is provided with the spokes $b$, rim $c$, and hub $d$, the latter having formed therein on each side the central depression or recess, $e$, for the purpose hereinafter explained, and a series of holes, $f$, around said recess for the bolts employed in attaching the axle or spindle to the body of the wheel, as hereinafter explained. A wrought-metal tire is generally shrunken upon the wheel to strengthen it. Secured to each side of this wheel-body $a$ are the spindles $h\ h'$, which form the axle of the wheel. These spindles have at their inner end the enlarged flange $i$, which has therein a number of holes, $j$, corresponding to those in the hub $d$, and on the inner face of the flange is a central projection or lug, $k$, which fits into the recess $e$, and serves to center the spindle and take the shearing or torsional strain from the bolts which hold the spindle to the hub, both the recess $e$ and lug or projection $k$ being angular in shape, so sustaining all torsional or twisting strains, and the sides of said recess and projection being beveled or inclined, so that they are perfectly centered and all side movement is prevented when they are drawn together. The spindles $h\ h'$ are held to the hub $d$ of the wheel-body $a$ by a series of bolts, $l$, which pass through the holes $j$ in flange of the spindle and the holes $f$ of the hub of the wheel, and are provided with nuts $l'$ on their outer ends. By screwing up the nuts $l'$ tightly the lugs $k$ on the spindles are forced firmly into the recesses $e$, and thereby centered and firmly secured, as above described, and any shearing-strain which comes on the spindles will be resisted by these lugs pressing against the sides of the recess, as well as by the bolts $l$. To secure a stronger gudgeon or journal for the spindles $h\ h'$, and avoid the necessity of making the entire spindle of wrought-iron, I cast the spindles with a wrought-iron rod, $m$, projecting from the end thereof, this rod having a head, $m'$, thereon, at a distance from the shoulder $h^2$ of the spindle, which distance is sufficient to give an ample journal or gudgeon for the spindles. Any suitable method of casting this rod $m$ in the spindles $h\ h'$ may be employed, and it is desirable that the rod shall extend nearly to the inner end of the spindle, so that the greatest amount of purchase is given to the rod and the spindle strengthened throughout its entire length.

To attach the axle to the frame of the barrow—that is, the frame which supports the body of the barrow—a bearing-block, $n$, is formed with an upwardly-projecting flange, $n'$, on its upper side to fit against and bear on the sides of the side bar or arm $o$ of the frames when the bearing-block is in place, and with a groove or concave bearing-face, $n^2$, on its under side for the journals of the spindle, and also with vertical grooves $n^3$ on each side to form a seat for the hook-shaped bolt $p$, which holds the rod $m$ in position in the bearing $n^2$ when the wheel is in place, the head $m'$ of the rod fitting outside of the block $n'$. With this construction when the barrow is dumped, the weight being on the bar on the lower side of the barrow, the thrust is communicated from the latter to the block $n$ by the flange $n'$, and as the block $n$ rests against the head $m'$ of the rod $m$ the strain or weight is communicated from the lower bar $o$ to the rod $m$, and by the rod to the wheel, and through the wheel-spindles to the other bar of the frame, the strain or weight thus tending to draw in the lower bar and through the wheel to hold the bars in proper line, and thus prevent the spreading of the frame.

If at any time the body of the wheel becomes broken, it can be removed and a new wheel inserted, and if the spindles become loose on the hub the nut $l'$ may be screwed up to tighten the parts in place. In consequence of the strengthening of the spindles of the wheel by the wrought iron or steel rods $m$ a strong and rigid axle for the wheel is obtained, which is so firmly united to the wheel that it is not liable to work loose.

Having now described my invention, what I claim is—

1. In a barrow-wheel, the combination, with a wheel-body having a central hub forming part thereof, of cast-iron spindles attached to the side of said hub, and each having a wrought-iron gudgeon extending nearly through and projecting beyond the outer end of the spindle, substantially as and for the purpose set forth.

2. In a barrow-wheel, the combination, with a wheel-body having a recess on each side and in the center thereof, of a spindle attached to each side of the body, each spindle having a lug on its inner end, which fits into one of the said recesses, substantially as and for the purpose set forth.

3. In a barrow-wheel, the combination of the body $a$, having the angular recesses on each side of the center thereof, and the spindles attached on each side of said body, said spindles having the angular lugs or projections $k$, corresponding in shape to said recesses $e$ and fitting therein, substantially as and for the purposes set forth.

4. In a barrow-wheel, the combination of the body $a$, having the recesses $e$ therein, the spindles $h\ h'$, bolted to said body, the said spindles having lugs $k$ on the inner ends, which fit in said recesses, and a rod, $m$, cast in the spindles and projecting beyond the outer end of the same to form bearings, substantially as and for the purpose set forth.

5. In a barrow-wheel, the combination, with the bearing-block $n$, having upwardly-projecting flange $n'$ thereon, of the gudgeon or journal $m$, having the head $m'$ on its outer end, and means for holding the journal in its seat in the bearing-block, substantially as and for the purpose set forth.

In testimony whereof I, the said DAVID LONG, have hereunto set my hand.

DAVID LONG.

Witnesses:
SAMUEL PORTER,
SAMUEL KURTZ.